ial Patent [19]

Ariannejad

[11] Patent Number: 4,999,389

[45] Date of Patent: Mar. 12, 1991

[54] FILLED RESIN COMPOSITIONS AND ARTICLES MADE THEREFROM

[75] Inventor: Gholamhossein Ariannejad, San Antonio, Tex.

[73] Assignee: Fiber Glass Systems, Inc., San Antonio, Tex.

[21] Appl. No.: 290,042

[22] Filed: Dec. 27, 1988

[51] Int. Cl.⁵ .......................... C08K 7/14; C08K 7/12; C08K 7/04

[52] U.S. Cl. .................................. 523/440; 523/443; 523/444; 523/468

[58] Field of Search ............... 523/444, 443, 440, 153, 523/468; 524/495, 496

[56] References Cited

U.S. PATENT DOCUMENTS

| | | | |
|---|---|---|---|
| 3,202,560 | 8/1965 | Michael | 156/162 |
| 3,381,715 | 5/1968 | Michael | 138/109 |
| 3,381,716 | 5/1968 | Michael | 138/109 |
| 3,483,896 | 12/1969 | Grosh | 138/141 |
| 4,106,797 | 8/1978 | Michael | 156/173 |
| 4,138,285 | 2/1979 | Michael | 156/161 |
| 4,325,766 | 4/1982 | Michael | 156/171 |
| 4,508,855 | 4/1985 | Peters | 523/153 |

FOREIGN PATENT DOCUMENTS 0670971 9/1963 Canada ................................. 523/443

Primary Examiner—Lewis T. Jacobs
Attorney, Agent, or Firm—Joseph P. Calabrese

[57] ABSTRACT

A filled resin composition is provided which is particularly adapted for the formation of wear-resistant, lubricious surfaces. The compositions when formed into integral threads with the bodies of plastic-reinforced pipe provide superior thread action and extended thread life.

The compositions comprise a thermosetting resin such as epoxy resin and hardener, in combination with a filler which in turn comprises ceramic powder, graphite and short fiber lengths. The compositions may vary widely as will hereinafter become apparent.

13 Claims, 1 Drawing Sheet

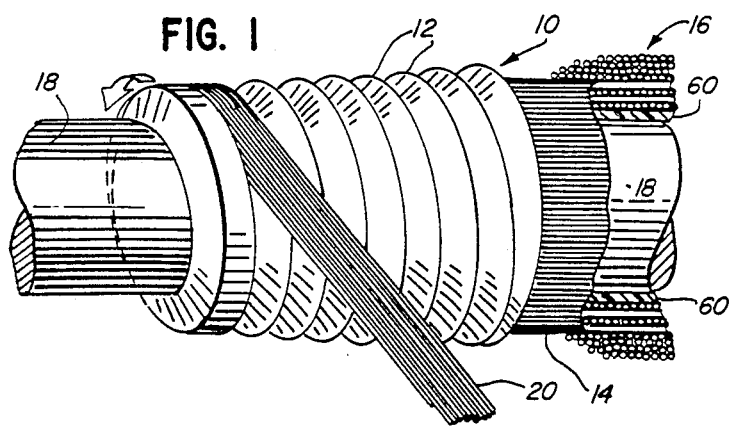
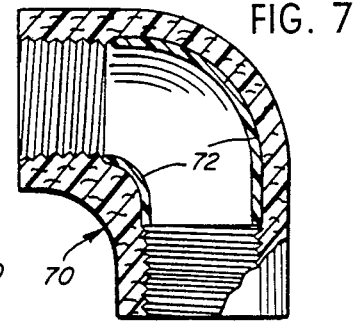
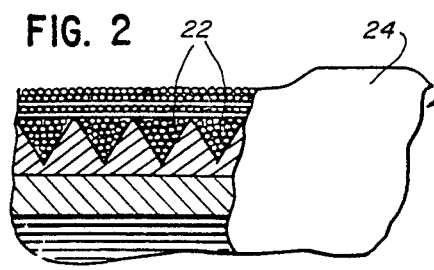
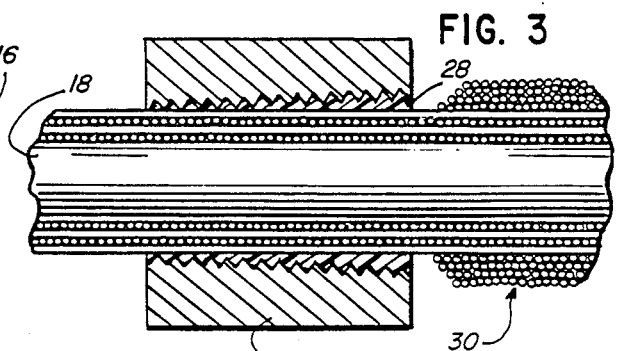
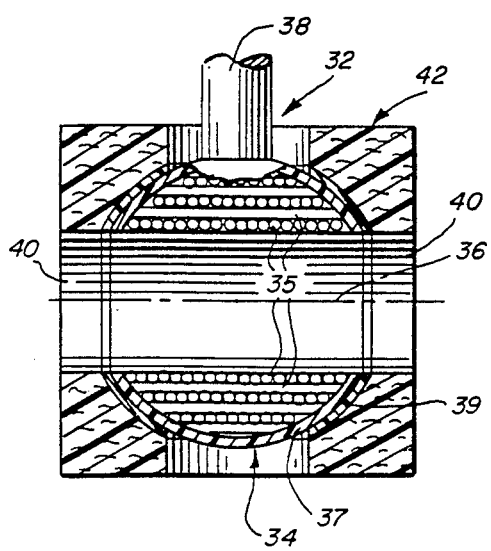
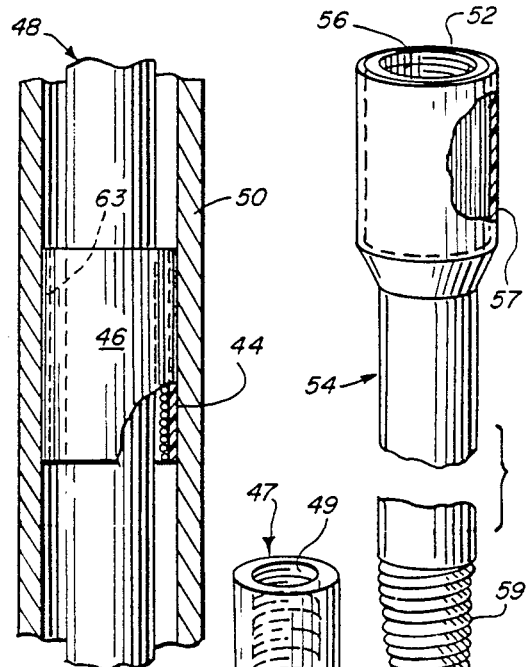

FILLED RESIN COMPOSITIONS AND ARTICLES MADE THEREFROM

This invention pertains to improved wear-resistant compositions, and more particularly relates to filled resin compositions which may be molded into surfaces having improved lubricity.

The provided compositions of this invention are particularly useful in the formation of molded plastic threads of the type disclosed in U.S. Pat. Nos. 3,381,715 and 3,381,716, the disclosures of which are incorporated herein by reference. These patents disclose resin threads which are molded integrally with the bodies of filament-reinforced plastic pipe such as is disclosed in U.S. Pat. No. 3,202,560, the disclosure of which is incorporated herein by reference.

Grosh U.S. Pat. No. 3,483,896 discloses filament reinforced plastic pipe comprising layers of high strength filaments separated by layers of particulate matter. Disclosed as the preferred particulate matter is sand, although carbon and graphite are also suggested for use as components with the disclosed pipe; however no specific examples are given. There is no suggestion, however, of the use of carbon in a resin matrix composition of the type hereinafter claimed for the purposes hereinafter set forth.

The prior art has long recognized the many advantages present in filament-reinforced resin pipe of the type disclosed in U.S. Pat. No. 3,202,560. Filament-reinforced plastic pipe in addition to having a high strength-to-weight ratio, possesses chemical resistance or inertness so as to be able to efficiently handle various corrosive fluids unable to be employed with conventional metal pipe.

Glass fibers are known to possess excellent tensile strengths of the order of 400,000 psi, and to provide excellent strength when incorporated as reinforcements in a resin matrix of a hardenable resin such as epoxy resin in the formation of a pipe body. However, difficulty has been experienced in efforts to form durable plastic threads for such reinforced plastic pipe. Such threads had been molded integrally with the bodies of plastic pipe as in the integral formation of both male and female threads at opposed pipe ends. Such reinforced resin or plastic pipe is then able to be self-connecting without the need for separate couplers. However, as such threads do not possess the durability of the pipe body, such threads comprise the weak links in a string of connected pipe such as may be hung vertically in an oil producing well.

It is an object of this invention therefore to provide novel, curable, reinforced resin compositions particularly adapted to form integral threads with reinforced plastic pipe and possessed of exceptional strength, enabling the pipe with which formed to have a desired, long working life.

It has also been found that in prior art plastic pipe, integral threads formed with such pipe, or threads formed in coupler members, progressively deteriorate in accordance with the number of threaded couplings and uncouplings or "makes and breaks" experienced in the normal course of pipe and/or coupler use. Prior art integral pipe threads progressively, and often rapidly, deteriorate with the threaded couplings and uncouplings experienced in the normal course of use. As a result, the useful pipe life is often terminated although the pipe body itself is in good mechanical condition because of the deteriorated condition of the pipe threads which prevents the pipe from being effectively connected. Such pipe must either be totally discarded, or, if the pipe condition permits, new replacement threads may be molded and formed on the pipe body after necessary surface preparation.

It is a further object of this invention to provide thread forming compositions for forming threads having working surfaces of desired lubricity which minimize the applied torque necessary to couple and uncouple pipe ends. Such reduced torque application reduces the stresses applied to the threads with resulting extended useful thread life.

The lubricity provided by the cured compositions of this invention is also employed to advantage in the formation of surfaces or liners in fluid-conveying pipes and fittings. Such surfaces for example, may be employed in conduits conveying high pressure fluid streams or streams of abrasive fluids having a tendency to abrade or wear away the conducting surfaces engaging the same.

It is thus an object of this invention to provide compositions particularly adapted for providing wear resistant lubricious surfaces such as in conduits, pipes, fittings and the like as well as in liquid-handling apparatus such as pumps and pump components.

In one embodiment of this invention, a female thread form is rotatably mounted on a mandrel. Filamentous reinforcements such as glass roving saturated in a resinous composition comprising uncured epoxy resin and hardener such as triethylene tetramine having approximately fifty per cent filler by weight is wound about the rotating thread form. The filler comprises about six percent by weight (of the filler) of graphite powder and six per cent by weight of chopped glass fibers. The remaining eighty-eight per cent of the filler weight comprises ceramic powder. The saturated roving is wound about the form until the threads of the mold are filled and a cylinder of substantially uniform diameter is formed. The female threads are integrally formed with the end of a filament-reinforced plastic pipe and cured, whereafter the thread form is threadably removed. The resulting threads are of superior strength being able to cycle through a large number of couplings and uncouplings without thread damage or deterioration. The lubrication of the female threads provided by the graphite, assisted by the strength and structural stability afforded by the ceramic powder and fibers disposed in the cured resin matrix result in a thread strength and durability heretofore unobtainable.

DESCRIPTION OF THE DRAWINGS

For a more complete understanding of this invention, reference will now be made to the drawings wherein:

FIG. 1 is a fragmentary perspective view illustrating a method wherein a filament reinforced plastic pipe has integral female threads formed therewith which may be formed in accordance with this invention utilizing the filled resin compositions of this invention;

FIG. 2 is a fragmentary, longitudinal, sectional view of a portion of the mold of FIG. 1 after female threads have been integrally formed with the end of a plastic pipe illustrated in elevation;

FIG. 3 is a fragmentary, longitudinal, sectional view illustrating a female mold whereby male threads may be integrally formed with a pin end of a filament-reinforced pipe utilizing the compositions of this invention;

FIG. 4 is a sectional view partly in elevation illustrating the manner whereby a ball valve adapted to be employed in conjunction with high fluid pressures and/or the control of passage of abrasive slurries, may be provided with wear-resistant surfaces made in accordance with this invention;

FIG. 5 is a fragmentary longitudinal sectional view, partly in elevation, illustrating a centralizer made in accordance with the teachings of this invention employed in oil well tubing;

FIG. 5A is a perspective view of a coupler-centralizer made in accordance with the teachings of this invention;

FIG. 6 is a fragmentary perspective view illustrating a sucker rod construction employed in well tubing and integrally formed with opposed male and female threads composed of the novel, filled, resinous composition of this invention; and FIG. 7 is a sectional view illustrating the manner whereby fittings such as the illustrated elbow may have inner fluid-engaging surfaces formed of filled resinous compositions made in accordance with this invention.

DESCRIPTION OF THE INVENTION

Referring now more particularly to FIG. 1, a female threaded form 10 is illustrated having male threads 12 disposed thereon. The form 10 is adapted to serve as a mold for the formation of female threads which will be integrally formed with terminal end 14 of a formed, filament-reinforced plastic pipe 16. The pipe has been formed in accordance with known prior art teachings such as that of Michael U.S. Pat. No. 3,381,716. It will be noted in FIG. 1 that the female nipple-like thread form 10 and the formed filament-reinforced pipe 16 are rotatably mounted on mandrel 18 rotating counterclockwise so as to pull saturated glass roving 20 or other suitable filamentous reinforcements such as carbon filaments which are saturated, about the periphery of the form 10.

It will be noted from FIG. 1 that the rotatable mandrel 18 together with the pipe 16 and the nipple form 10 are rotatably mounted on the mandrel 18 so as to pull roving 20 about the periphery of form 10, filling the roots of the threads 12 of the form 10 whereafter a substantially uniform cylindrical configuration may be formed about the crests and roots of the form 10 as indicated in FIG. 2.

In accordance with this invention, roving 20 is saturated with a resinous composition of this invention comprising a hardenable resin such as epoxy resin and hardener, which contains a novel filler composition composed of graphite, ceramic powder and chopped glass fibers.

The utilization of plastic threads integrally formed with filament reinforced plastic pipe is well known in the art as evident from the above-noted patents. However, such threads have heretofore had limited working life, particularly when subjected to numerous threading and unthreading cycles or "make and break cycles". In accordance with this invention, it has been found that the utilization of a small percentage of graphite powder in the curable resinous composition from which the threads are formed provides a desired lubricity which enhances the working life of the resulting threads such as threads 22 illustrated in the fragmentary view of FIG. 2. The latter figure depicts the end of pipe 16 after the female threads have been integrally formed with such adjacent pipe end which also has an enlargement 24 disposed adjacent the female threads to provide a reinforcement normally formed on such reinforced plastic pipe and which is engaged by wrenches or the like in the course of threading and unthreading the pipe.

In accordance with this invention, it has been found that rather broad ranges of resins and their fillers may be employed. Thus, the resinous compositions such as an epoxy resin may comprise 20-80% by weight of the total thread-forming composition and the fillers disposed therein may comprise 80-20% by weight. The fillers for such resins which have been found to work to advantage in accordance with this invention comprise mixtures of graphite together with a ceramic powder and chopped glass fibers of short length such as fibers of about 1/32 inch in length. Epoxy resins are provided by way of example only as other thermosetting resins may work to advantage. In the compositions hereinafter described the filler is substantially uniformly distributed throughout the resin matrix.

The compositions of the fillers within the resin matrix may also vary considerably in composition. Accordingly, the percentage of carbon powder may be present in the amount of approximately 0.5 to 10% by weight of the filler, and the ceramic powder which may be irregular in particle configuration or of spherical shape may comprise about 80-95% by weight of the filler. The chopped fibers may be glass whisker fibers, or asbestos fibers, and may be present in the amount of about 0.5-10% by weight.

A satisfactory ceramic powder is that sold under the brand name Zeeospheres by Zealand Industries, Inc. of 320 Endicott Building, St. Paul, Minn. The Zeeospheres may be hollow or solid, and composed of approximately 60% alumina and 40% silica and be of approximately 40-60 microns in particle size.

A suitable graphite powder for use in compositions of this invention is sold under the tradename Microfyne Graphite, by Joseph Dixon Crucible Co. of Jersey City, N.J.

If the graphite component of the filler of the resinous compositions employed in this invention is in fiber form, the chopped fiber component above referred to may be eliminated as the graphite fiber can then perform the functions of both the graphite and the fibers. However, in such compositions the graphite percentage should not exceed about 12 percent by weight of the filler to prevent formation of an overly slick surface. The remaining filler will comprise the silica powder.

The fibers employed in the compositions of this invention should be "high aspect ratio" fibers. That is, the fibers should have a length of about 10-15 times that of the diameter. The chopped fibers provide desired strength in the resulting cured resin, and when such resinous compositions are employed in the formation of threads such as illustrated in FIG. 1 such threads have enhanced chip resistance.

The ceramic component of the filler of the resinous compositions of this invention provides temperature stability and by virtue of its inertness, enhanced chemical resistance. Accordingly, the large percentage of the resin filler provided by the ceramic powder enhances the overall chemical resistance of the plastic matrix which is itself preferably chemically inert.

FIG. 3 illustrates a mold 26 adapted to form male threads 28 on the pin end of a pipe 30 fragmentarily illustrated. The mold 26 may have a viscous paste of resin and filler packed into the interior of the mold 26 so as to completely fill the thread recesses defined by the metal female threads of the mold 26. The mold and resinous composition are then slid over the outer periphery of the partially formed or completely formed pipe, the sliding action being carried out so as to avoid air entrapment and the loss of the packed resinous paste contained in the mold. The mold and the method of thread formation may be as disclosed in expired U.S. Pat. No. 3,381,716, utilizing an outer sleeve for resin-filler retention. The method of female thread formation referred to in the above discussion of FIGS. 1 and 2 may basically be as disclosed in U.S. Pat. No. 3,381,715.

However, an improvement in the method of male thread formation disclosed in U.S. Pat. No. 3,381,715 is provided by this invention. Such improvement comprises the use of centrifugal force to eliminate any entrapped air or other gases in the resin matrix packed into thread form 26. Thus, in the integral formation of male threads with small diameter pipe such as 1.5 inch diameter type, the mold 26 and pipe mounted on a mandrel are rotated at a speed of about 2000 rpm for approximately 15 seconds. Such method step assures the substantially complete elimination of entrapped gases in the resin filler composition and a resultant dense, desirably void-free thread structure.

For larger size plastic pipe adapted to be integrally formed with male threads, the speed of mandrel rotation may be reduced because of the greater radius of rotation. Thus, a $9\frac{5}{8}$ inch diameter pipe may have the packed male thread form therefor mounted on a mandrel which is rotated at a rotational speed of about 200 rpm for 50 seconds for desired gas and void elimination. The initially processed threads may then be subjected to desired cures such as an oven cure of about 40 minutes to one hour at a temperature of about 200° F.–250° F. Other size pipe threads may be similarly formed employing speeds of rotation and rotation times in proportion to those given for the above 1.5 inch and $9\frac{5}{8}$ inch pipe.

FIG. 4 illustrates ball valve assembly 32 comprising rotatable ball valve 34 having fluid passageway 36 therethrough and connected to stem 38 whereby the ball valve 34 may be rotated into the closed and open position illustrated. In the open position, passageway 36 of the ball valve is in alignment with ports 40 of housing 42.

Ball valve 34 may be formed of a cut segment of the wall of a fiber reinforced pipe such as disclosed in U.S. Pat. No. 3,202,560 and having a wall thickness greater than the diameter of ball valve 34. The pipe segment is formed into desired ball shape by turning on a lathe whereafter the ball outer surface and passageway periphery may be coated with a filled resinous composition of this invention as at 37 in FIG. 4. The mating seat surface 39 of housing 42 may similarly be formed of a cured layer of filled resinous composition made in accordance with this invention. Housing 42 may be fiber-reinforced as by alternating layers of glass fibers 35 employed in forming ball 34, or may comprise cured resin alone, as lesser stresses are imparted to the housing 42 than are applied to ball 34.

Such surfaces 37 and 39 are ground or otherwise suitably formed to desired mating finishes assuring desired fluid-sealing contact, and minimum friction in the course of ball-valve-seat relative movement.

The graphite component of the filler provides desired lubricity and extended working life of the mating surfaces 37 and 39 of the ball valve and receiving housing.

The ball valve and housing or either the ball valve or the housing may be formed completely of the resinous filled compositions of this invention. The benefits of extended life, however, may be obtained by forming the working surfaces 37 and 39 of the valve and housing of the novel composition of this invention or by having the glass roving or other filamentous reinforcements forming such surfaces thoroughly saturated with a filled resinous composition of this invention. The surfaces 37 and 39 may also be formed in any ball valve and housing composition of desired strength and capable of having the filled resinous compositions of this invention adhered thereto.

FIG. 5 illustrates a further application of the novel compositions of this invention, namely use of such compositions in forming outer peripheral surface 44 of centralizer or protector 46 which may be disposed on sucker rod 48 by clamping, pinning or other suitable means of securement. Rod 48 may comprise a member of a rod string reciprocally movable within tubing 50 for purposes of pumping a liquid such as oil from an underlying pool. As the outer periphery 44 of the centralizer 46 regularly comes into contact with the inner periphery of the tubing 50 during string reciprocation, the wear-resistant composition of this application defining the outer periphery 44 of the centralizer will assure an extended life therefor. Similarly to the outer periphery of the ball valve of FIG. 3, the outer layer 44 may be a resin-filled layer or comprise the saturant of filaments from which the centralizer is formed.

A wear resistant centralizer may also be formed on a female end 52 of a sucker rod 54 integrally formed with female (56) and male (59) threads at the opposed ends as seen in FIG. 6. The enlarged female end having the interior female threads 56 may also have wear resistant liner 57 formed therewith so as to simultaneously function as a centralizer. The walls of the centralizers 46 may be appropriately slotted or otherwise relieved at 63 to facilitate fluid flow between the centralizer and tubing. Female end 52 of sucker rod 54 may be similarly relieved at an outer peripheral portion spaced from threads 56.

Coupling centralizers 46 as well as sucker rods 48 and 54 may be formed in accordance with the teachings of U.S. Pat. No. 4,138,285 assigned to the assignee of the subject application, the disclosure of which is to be incorporated herein by reference. The sucker rods effect fluid flow when subsurface pressure is inadequate to effect oil flow by actuating a submerged pump which discharges oil through tubing 50 illustrated in FIG. 4. Normally long strings of rods are subjected to severe flexing, requiring means such as the centralizers 46 to maintain the rods in a centered operable condition. Centralizers are also employed on drill pipe as is well known in the art, and the benefits from the wear resistant surfacings of the centralizers are also obtained where employed with drill pipe.

Centralizer 46 may take the form of a coupler 47 illustrated in FIG. 5A and having female threads 49 disposed at opposed ends for engaging male threads disposed on the ends of sucker rods joined thereby. Such a coupler construction thus performs the dual function of centralizer and coupler.

The female threads 49 and 56 are preferably formed of the filled compositions of this invention. Couplers 47 may be formed in accordance with the basic process steps of U.S. Pat. No. 4,325,766 assigned to the assignee of this invention and the disclosure of which is incorporated herein by reference. The forming steps of the latter patent are modified so as to form the female threads of the filled resin compositions of this invention and the outermost peripheries of such couplers are formed of filamentous reinforcements saturated with the compositions of this invention. In an alternative construction, an outer layer of a filled resinous composition of this invention may be troweled about the periphery of an uncured fiber-reinforced coupling to provide a desired lubricious outer periphery.

The novel lubricating, wear-resistant surface provided by the resin filled compositions of this invention may of course also be formed on the inner surface of the tubing 50 of FIG. 5 for prolonging the life of the sucker rod string which engages the inner periphery of the tubing by means of the outer peripheral surface 44 of the centralizers. The tubing may also be formed of filament reinforced plastic such as an epoxy resin. The wear resistant surfaces may be secured to the inner periphery of a metal tubing after appropriate surface preparation to assure desired adherence.

Any pipe conducting an abrasive slurry or the like whether disposed in the vertical plane such as tubing 50 illustrated in FIG. 4, or conveying liquid or slurry in the horizontal plane, may have the working life extended by the presence of an inner liner formed of the novel, filled resin composition of this invention. Thus pipe 16 of FIG. 1 may have an inner liner 60 of glass filaments saturated with filled resinous composition of this invention.

The wear resistant characteristics of the provided compositions of this invention may also be used to advantage in the formation of inner surfaces of fittings subjected to wear in the conveying of liquids, particularly fittings adapted to conduct liquids under high pressure, and liquids or slurries which are highly abrasive in character.

FIG. 7 illustrates a 90° elbow 70 which may be filament reinforced, and having an inner wear resistant liner 72 formed of a cured composition of this invention. The body of the elbow 70 may be a filament reinforced plastic and manufactured in accordance with the disclosure of U.S. Pat. No. 4,106,797 or may comprise a metal fitting having an inner coating of the composition of this invention. This patent is assigned to the assignee of this application and the disclosure thereof is incorporated herein by reference.

The innermost filament reinforcements employed in forming such elbow may be saturated with a filled resinous composition of this invention. Also, a coating for such filled resinous composition may be evenly troweled over the inner periphery of such elbow, preferably prior to final curing of the formed elbow. The threads of the elbow are also desirably formed of the compositions of this invention.

The entire resin matrix of this and the other illustrated articles of the drawing may of course be formed of the compositions of this invention rather than prior art epoxy compositions such as disclosed in U.S. Pat. No. 4,325,766. Because of the cost of the filled compositions of this invention the main body portions of the articles illustrated and discussed may be formed as indicated in the prior patents after the desired surfacing, thread or the like has been formed of the improved composition.

The foregoing drawing figures have illustrated various applications wherein the novel compositions of this invention may serve to advantage, however, the various applications illustrated are presented by way of example and not limitation.

Table 1 sets forth compositions which may be employed for purposes of forming the various hardenable, wear resistant surfaces and articles or article components, of this invention. A specific resinous composition which will function advantageously in various applications comprises 100 parts by weight of epoxy resin mixed with 11 to 14 parts by weight of a hardener such as triethylene tetramine. Other epoxy resin components of the provided compositions of this invention are of substantially the same resin-hardener composition. In the resin-filler composition such resin and hardener may comprise 40% by weight. The remaining 60% by weight comprising filler, is comprised of 10% by weight graphite powder 80% by weight of ceramic powder and 10% by weight of cropped, high aspect ratio glass fibers. Other resin filler compositions illustrating working embodiments of this invention are apparent from Table 1 appearing below.

TABLE I

| The composition may be as follows: | | | | |
|---|---|---|---|---|
| | (1) | (2) | (3) | (4) |
| Resin (gr.) | 20 | 40 | 55 | 80 |
| Fillers (gr.) | 80 | 60 | 45 | 20 |
| Compound (gr.) | 100 | 100 | 100 | 100 |
| 1. (a) 20 gr. Resin | | | | |
| (b) 80 gr. Fillers | | | | |
| I. Graphite | 5 gr. (6.3%) | 3 gr. (3.8%) | *5 gr. (6.3%) | |
| II. Ceramic | 70 gr. (87.4%) | 69 gr. (86.2%) | 75 gr. (93.7%) | |
| III. Short Fibers | 5 gr. (6.3%) | 8 gr. (10%) | 0 gr. (0%) | |
| 2. (a) 40 gr. Resin | | | | |
| (b) 60 gr. Fillers | | | | |
| I. Graphite | 3 gr. (5%) | 5 gr. (8.3%) | *3 gr. (5%) | |
| II. Ceramic | 55 gr. (91.7%) | 50 gr. (83.3%) | 57 gr. (95%) | |
| III. Short Fibers | 2 gr. (3.3%) | 5 gr. (8.4%) | 0 gr. (0%) | |
| 3. (a) 55 gr. Resin | | | | |
| (b) 45 Gr. Fillers | | | | |
| I. Graphite | 3 gr. (6.7%) | 4 gr. (8.9%) | *4 gr. (8.9%) | |
| II. Ceramic | 40 gr. (88.9%) | 37 gr. (82.2%) | 41 gr. (91.1%) | |
| III. Short Fibers | 2 gr. (4.4%) | 4 gr. (8.9%) | 0 gr. (0%) | |
| 4. (a) 80 gr. Resin | | | | |
| (b) 20 gr. Fillers | | | | |
| I. Graphite | 2 gr. (10)% | 1 gr. (5%) | 1 gr. (5%) | |
| II. Ceramic | 16 gr. (80%) | 18 gr. (90%) | 17 gr. (85%) | |

TABLE I-continued

The composition may be as follows:

| III. Short Fibers | 2 gr. (10)% | 1 gr. (5%) | 2 gr. (10%) |
|---|---|---|---|

The above exemplary compositions illustrate embodiments of the provided compositions, all of which employ graphite in the filler.
*Fiber When employing male threads formed about the pin end of a filament reinforced pipe in which the male threads of the pin end were made in accordance with prior art compositions, greater torque is required than when employing threads made from compositions of this invention. Thus, the force necessary to effect a full threaded engagement of such prior art male threads when received in the prior art female threads of a coupler of the type illustrated in FIG. 5A. was approximately 1,000 foot/pounds. Such male and female threads were made of an epoxy resin composition of the prior art as disclosed in U.S. Pat. No. 4,325,766 employing triethylene tetramine as a hardener, silica powder and a thickener, but having no fibers or graphite. After ten couplings and uncouplings the necessary applied force for making a threaded joint decreased to 445 foot/pounds. The force necessary to uncouple such threaded joints decreased from in excess of 1100 foot/pounds to approximately 730 foot/pounds after ten couplings and uncouplings.

The foregoing torque data is to be compared with the following torque figures for coupling and uncoupling a pin end of a pipe having a male thread made in accordance with this invention from a coupling member having female threads formed from the novel compositions of this invention. The coupling or "make" force decreased from 450 foot/pounds to effect the first coupling to approximately 400 foot/pounds to effect the tenth coupling. The "break" force necessary to uncouple the threaded joints was reduced from slightly under 550 foot/pounds for the first uncoupling to approximately 520 foot/pounds for the tenth uncoupling.

The foregoing data related to filament reinforced plastic pipes which were formed in an identical manner, the pipe diameter being four inches and the pipe couplers and threaded joints being formed as precisely alike as possible. The differences in the compared pipe and couplers comprised the difference in composition of the male and female threads. Comparable results would of course be obtained if the female threads were integrally formed with the pipe ends rather than in discrete couplers. The thread compositions were those employed in the sight tests hereinafter described.

The improved wear characteristics of pipe threads of the resinous compositions of this application are further evidenced by tests of two-inch and four-inch filament reinforced plastic pipe incorporating threads of prior art epoxy resin compositions employing no carbon and no chopped fibers. Such control pipe threads were comparatively tested with similar two and four inch pipe differing in that the threads formed thereon were formed from the filled resinous compositions of this invention. Specifically the threads were formed of an epoxy resin comprising 40% by weight of epoxy and 60% by weight of filler. The filler comprising 3% by weight of graphite powder, 5% by weight of high aspect ratio glass fibers and 92% ceramic powder. Following ten "makes and breaks," the male and female threads of the prior art compositions containing no graphite and no chopped glass fibers but formed of cured epoxy resin, ceramic powder and a thickener visibly appeared to have deteriorated and were substantially inferior to those threads formed from the composition of this invention. The threads of the prior art were chipped and partially broken, whereas threads formed in accordance with the compositions of this invention were seen to physically resemble the original condition following ten couplings and uncouplings.

An indication of the improved strength characteristics of the compositions of this invention comprises Table II illustrating the superior compressive strength of test specimens made from compositions of this invention.

The following Table II clearly illustrates that the strength of the compositions provided by this invention does not suffer because of the fillers added to the epoxy resin matrix.

In the following Table II, sample No. 1 was formed of a composition made in accordance with this invention and comprises 40 grams of epoxy resin and 60 grams of filler. The filler was composed of 55 grams of ceramic powder, 3 grams of graphite powder and 2 grams of chopped glass fibers.

Sample No. 2 also comprises 40 grams of epoxy resin and 60 grams of filler of which 57 grams comprised ceramic powder and 3 grams comprised chopped graphite fibers. No glass fibers were present in Sample No. 2.

Sample No. 3 also comprised 40 grams of epoxy resin and 60 grams of a filler comprising silica. No graphite or chopped fibers were present in Sample No. 3.

It will be noted from the footnote (1) beneath Table II that all of the samples were blended with a triethylene tetramine hardener as an initial step in the course of forming the samples for use in the tests, the results of which are tabulated in Table II. It is apparent from Table II that the novel fillers of this application did not detract from the compression strength in the samples tested, but in fact imparted excellent strength, if not strength superior to Sample No. 3.

TABLE II

| | COMPRESSION STRENGTHS | | |
|---|---|---|---|
| SAMPLE NO. | 1 | 2 | 3 |
| Compression Strength, 23° C., psi Maximum, Avg. | 18,300 | 17,100 | 17,300 |
| Std. Deviation | 225 | 410 | 680 |
| High | 18,500 | 17,500 | 17,700 |
| Low | 18,000 | 16,400 | 16,100 |
| Compression Deformation, 23° C., psi Maximum, Avg. | 5.8 | 5.6 | 5.6 |
| Std. Deviation | 0.27 | 0.22 | 0.57 |
| High | 6.1 | 5.9 | 6.4 |
| Low | 5.4 | 5.4 | 4.8 |
| Avg. Compression Modulus, 23° C. psi | 1,180,000 | 1,160,000 | 1,200,000 |
| Std. Deviation | 57,000 | 48,000 | 23,000 |
| High Value | 1,260,000 | 1,200,000 | 1,240,000 |
| Low Value | 1,120,000 | 1,080,000 | 1,190,000 |

(1)Samples 1-3 were blended with triethylene tetramine hardener, ratio 100 grams epoxy resin/5.4 grams TETA. The samples were cast in brass tubing 0.50 inch ID. Cure: Gel @ 25° C. plus 2 hours @ 65° C. Castings were released, cut 1.75 inch long (ASTM D695) and machined smooth on the ends. Five specimens per system were tested.

The compositions of this invention are capable of being employed in many applications as is evident from the above. The compositions may be employed for formation of any surface where wear resistance is desired in addition to chemical inertness, lubricity and chip resistance. The various resinous compositions of this invention are employed in a fluid or moldable state and take an initial set at a temperature range of about 75° F. to 100° F. in about 5 minutes. The formed resins are then preferably subjected to an oven cure of about 40 minutes to 1 hour at a temperature of about 200° F. to 250° F.

The filled resin compositions for forming the male threads in the manner above described preferably are viscous in nature to facilitate the forming process. Accordingly, the resin to filler ratio is preferably within the ranges of fifty percent resin fifty percent filler to thirty percent resin seventy percent fillers.

The coatings which may be applied to the ball valves or troweled onto formed surfaces are desirably more viscous, and preferably sixty to eighty percent filler and forty to twenty percent resin. Such coatings are preferably at least about 1/16 inch thick.

The saturant composition for the fimamentous reinforcements forming the lubricious linings and female threads are desirably more fluid for ease of filament saturation and preferably twenty to thirty-five percent filler and eighty to sixty-five percent resin.

The foregoing description has made apparent the variety of compositions which may be formed in accordance with this invention as well as the large number of practical applications as for high-strength threads, wear resistant surfaces, etc. It is believed that the foregoing description has made apparent to those skilled in the art, various modifications and applications of the disclosed invention which are not specifically described above but which are intended to be within the ambit of the invention of this application. Thus, although the preferred form of carbon for use in the provided composition is graphite because of its well known lubricious characteristics, other forms of carbon are included within the scope of this invention which forms provide the desired lubricity and wear resistance in the surfaces and articles formed from the provided compositions.

This invention is to be limited therefore only by the scope of the appended claims.

What is claimed is:

1. A curable, thread-forming composition comprising about eighty to twenty percent by weight of thermosetting resin and hardener therefor, and about twenty to eighty percent by weight of filler; said filler consisting essentially of ceramic powder and graphite in fibrous form; said graphite being present in the amount of about one-half to ten percent by weight of said filler.

2. A curable, thread-forming composition comprising about eighty to twenty percent by weight of thermosetting resin and hardener therefor, and about twenty to eighty percent by weight of filler; said filler comprising ceramic powder present in the amount of about eighty to ninety-five percent by weight of said filler, chopped, high-aspect ratio fibers, and graphite present in the amount of about one-half to ten percent by weight of said filler.

3. The composition of claim 2 in which the threads to be formed are male threads consisting essentially of said composition, and the resin and hardener-filler ratio is between fifty to seventy percent filler and fifty to twenty percent resin and hardener by weight.

4. The composition of claim 2 in which the threads to be formed are female threads consisting essentially of spirals of glass roving embedded in said composition having a resin and hardener-filler ratio of between sixty-five to eighty percent resin and hardener and thirty-five to twenty percent filler by weight.

5. The composition of claims 1 or 2 in which said resin comprises epoxy resin.

6. The composition of claim 2 in which said fibers are chopped glass fibers, and said graphite is present in powder form.

7. The composition of claim 1 on which said graphite is present in the form of short lengths of chopped fibers about 1/32 inch in length.

8. A wear resistant, curable, lubricious composition particularly adapted for the integral formation of threads with the body of a plastic-filament-reinforced pipe, fitting or the like comprising about twenty to thirty percent by weight epoxy resin and hardener and about seventy to eighty percent by weight of filler; said filler comprising ceramic powder in a weight percentage of about eighty to ninety-five percent by weight of said filler, graphite powder in a weight percentage of about one-half to ten percent by weight of said filler and chopped high-aspect ratio fibers in a weight percentage of about one half to ten percent by weight of said filler.

9. A curable thread forming composition for integral formation with the body of a plastic-filament reinforced pipe, fitting or the like, comprising about twenty to eighty percent by weight epoxy resin and hardener and about twenty to eighty percent by weight filler; said filler comprising ceramic powder in a weight percentage of about eighty-eight to ninety-nine and one-half percent by weight of said filler, and chopped graphite fibers in a weight percentage of about one-half to twelve percent by weight of said filler.

10. The composition of claim 1, 2, or 9 in which said ceramic powder is composed of approximately sixty percent alumina and forty percent silica and is approximately 40–60 microns in particle size.

11. The composition of claim 9 in which said hardener comprises triethylene tetramine and is present in the amount of about eleven to fourteen percent by weight of said epoxy resin.

12. The composition of claim 9 in which said chopped graphite fibers are substituted by chopped glass fibers.

13. The composition of claim 9 in which said chopped graphite fibers are substituted by chopped asbestos fibers.

* * * * *